United States Patent [19]
Johnson, Jr. II

[11] 4,268,988
[45] May 26, 1981

[54] 2 IN 1 BOBBER SUPER AND REGULAR

[76] Inventor: Clarence Johnson, Jr. II, P.O. Box 43, 730 Hoffman Ave., Bellport, Long Island, N.Y. 11713

[21] Appl. No.: 18,563

[22] Filed: Mar. 8, 1979

[51] Int. Cl.³ .................. A01K 93/00; A01K 91/04
[52] U.S. Cl. ................... 43/43.11; 43/44.9; 43/43.1
[58] Field of Search ............... 43/42.74, 43.1, 43.11, 43/44.9, 44.91

[56] References Cited
U.S. PATENT DOCUMENTS

| 86,786 | 2/1869 | Tellgmann | 43/44.9 |
|---|---|---|---|
| 1,317,496 | 9/1919 | Hessler | 43/44.91 X |
| 2,509,704 | 5/1950 | Streitwieser | 43/44.9 X |
| 2,693,049 | 11/1954 | Atton | 43/44.9 |
| 2,738,609 | 3/1956 | Reed | 43/43.1 X |
| 2,847,792 | 8/1958 | Kuhlmann | 43/44.9 |
| 3,067,538 | 12/1962 | Hines | 43/42.74 |
| 3,104,487 | 9/1963 | Havel | 43/44.9 X |
| 3,114,984 | 12/1963 | Atton | 43/44.9 |
| 3,168,790 | 2/1965 | Creasey | 43/43.11 |
| 3,464,141 | 9/1969 | Amlin | 43/43.11 |

FOREIGN PATENT DOCUMENTS 1428948  1/1966  France ........................ 43/42.74

Primary Examiner—Nicholas P. Godici
Assistant Examiner—Robert P. Olszewski

[57] ABSTRACT

A specially designed bobber, for permitting fishing at an upper region and a lower region of water at the same time, by the use of a single fishing pole; the bobber, in one design, having side eyelets, from which short leaders support fishing hooks at shallow depths, while the fishing line extends downward, through the center of the bobber, to a lower depth, where fishing hooks are attached thereto.

1 Claim, 4 Drawing Figures

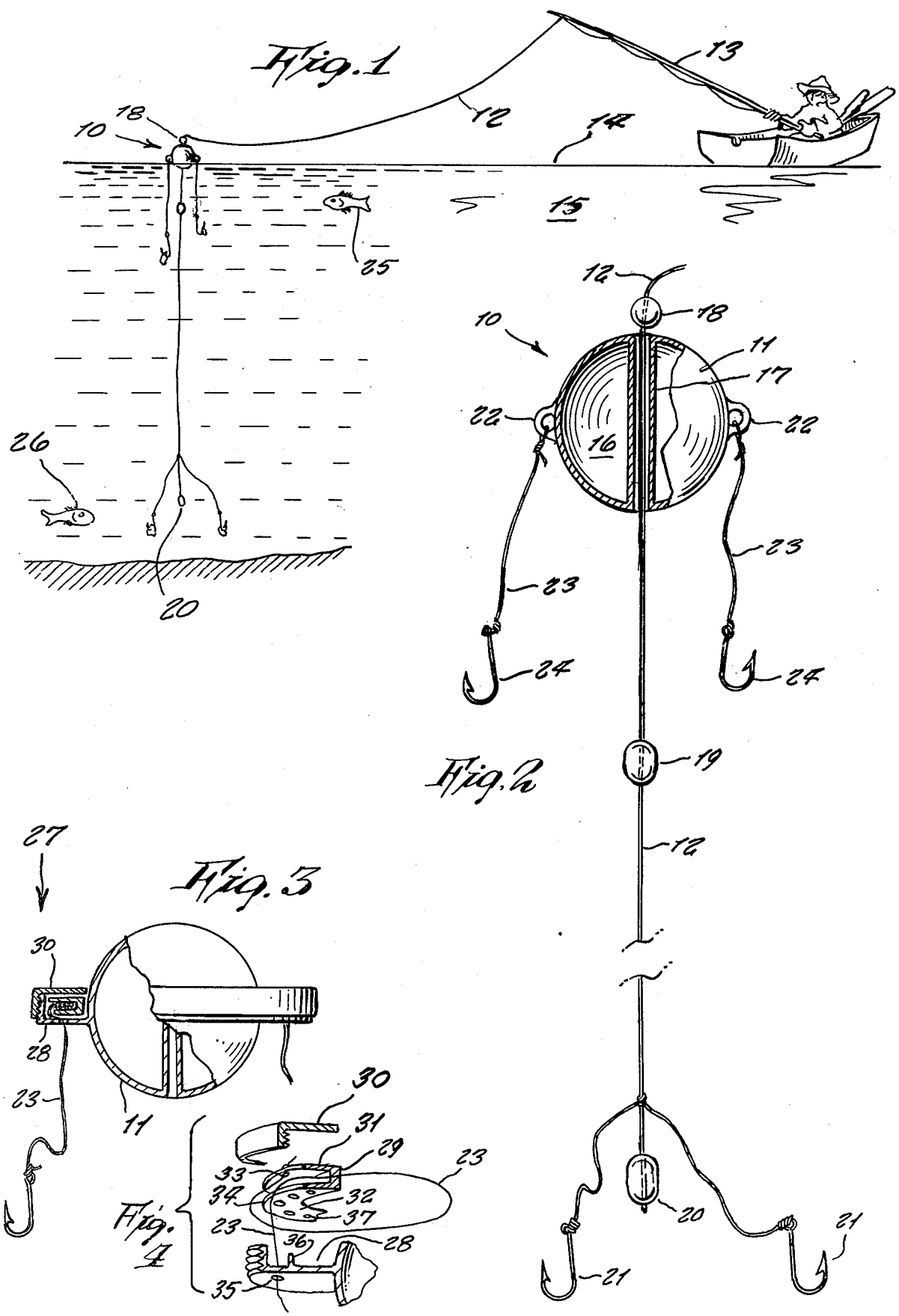

"2 IN 1" BOBBER SUPER AND REGULAR

This invention relates generally to fishing tackle for sport fishermen.

It is well known, to sport fishermen, that fish often change their depth of feeding, so that the fisherman is obliged to hunt for the fish at different depths of the water. Accordingly, sometimes he may wish to fish at an upper and lower level of the water at the same time. However, this requires the use of two fishing poles, when conventional tackle is used. This situation is, accordingly, in want of an improvement.

Therefore, it is a principal object of the present invention to provide a "2 in 1" floater, which permits both upper and lower level fishing, by using only a single fishing pole.

Another object is to provide a "2 in 1" floater, which quickly and easily allows adjusting the lines to various different depths of the water, in order to get to the locations of the fish.

Other objects are to provide a "2 in 1" bobber, which is simple in design, inexpensive to manufacture, rugged in construction, easy to use and efficient in operation.

These, and other objects, will be readily evident, upon a study of the following specification, and the accompanying drawing, wherein:

FIG. 1 is a side view of the invention, shown in use, fishing both a bottom and surface area of the water, so as to catch fish in both places;

FIG. 2 is an enlarged view of the invention, shown partly in cross-section;

FIG. 3 is a similar view of a different design of the floating bobber, which allows quick and easy adjustment of the fishing line lengths for the upper hooks, so as to eliminate tying them by hand to the rings, as shown in FIG. 2, and FIG. 4 is a detail of the construction shown in FIG. 3.

Referring now to the drawing in greater detail, and more particularly, to FIGS. 1 and 2 thereof at this time, the reference numeral 10 represents a "2 in 1" floater, according to the present invention, wherein there is a spherical bobber 11, located along a fishing line 12, extending from a fisherman's fishing pole 13, the bobber resting on the water surface 14 of a lake, river or other water body 15.

A plurality of eyelets 22, formed around the equator of the bobber, have short lines 23 tied thereto, for supporting upper fishing hooks 24 at a selected upper elevation of the water.

The bobber comprises a hollow shell, having a hermetically sealed interior chamber 16, filled with air, so as to provide flotation. The line hangs through a tubular central portion 17 of the bobber. A bead 18, on the line above the bobber, serves to limit the amount of the line that is allowed to pay out, downward, through the bobber. A sinker 19 along the line, immediately below the bobber, arrests the line paying out of the bobber, when the line is being reeled in. Another sinker 20, near a lower end of the line, serves to maintain lower fishing hooks 21, at a selected lower elevation of the water body.

In operative use, fish 25, at an upper elevation of the water, or fish 26 at a lower elevation thereof, are thus more easily and readily caught.

In order to adjust the elevation of the lower hooks, the bead 18 (and sinker 19) are simply slid along the line, as wished. Adjustment of the upper hooks is accomplished by untying the short lines 23 from the eyelets 22, and re-tying them at a selected length.

In FIGS. 3 and 4, another design 27 is shown, whereby the elevation of the upper hooks 24 is accomplished quickly and easily, without the need of untying the lines 23. In this design, the bobber is made with an equatorial trough 28, around its outer side, in which a ring-shaped reel 29 is placed, and retained therein by a ring-shaped cover 30, screw threaded to the outer side wall of the trough. The lines 23 are wound around the reel between upper and lower reel flanges 31 and 32, the ends of the lines 23 being securely tied in a hole 33 of the upper flange. The opposite ends of the lines hang downwardly, over the edge 34, of the lower flange, and then downwardly through holes 35 in the bottom of the trough. The lengths of the downwardly hanging portions of the lines are simply adjusted by merely rotating the reel, so as to either wind up, or unwind, the lines, as wished. The reel is secured in selected, rotated position, by means of a single upward protrusion 36, in the trough, being selectively engaged in either one of a circular row of upward holes or indentations 37, formed on the underside of the reel lower flange. Thus, adjustment is quicker to accomplish, and efficient.

While various changes may be made in the detail construction, it is understood that such changes will be within the spirit and scope of the present invention, as is defined by the appended claims.

What I now claim is:

1. A "2 in 1" floater, comprising, in combination, a spherical bobber consisting of a hollow shell around a sealed air chamber therewithin, a tubular portion vertically through a center of said bobber, a fishing line extending through said tubular portion, a bead along said line being located above said bobber, a first sinker along said line being located immediately below said bobber, a lower end of said line extending downwardly from said first sinker, a terminal lower end of said line having a second sinker and supporting a plurality of lower hooks; a trough formed around an equatorial outer side of said spherical shell, a ring-shaped reel rotatably adjusted in said trough and surrounding said spherical shell, said reel including a radially outwardly upper and lower flanges, a plurality of second lines wound around said reel, one end of each said second line being tied in a hole on said reel upper flange, a plurality of holes also through a bottom wall of said trough, each said second line having its opposite end extended around a peripheral edge of said reel lower flange and through one said hole in said trough bottom wall, a single upward protrusion on said trough bottom wall selectively being engaged in one of a circular row of upward indentations around said reel lower flange, and a ring-shaped cover screw-threaded to a vertical, outer peripheral wall of said trough, retaining said reel in said trough and against said protrusion, and a fish hook on said opposite end of each said second line.

* * * * *